United States Patent [19]
Lawrence et al.

[11] Patent Number: 5,499,615
[45] Date of Patent: Mar. 19, 1996

[54] DIRECT INJECTION PROPANE FUEL SYSTEM FOR DIESEL ENGINE APPLICATIONS

[75] Inventors: Keith E. Lawrence, Peoria; Kenneth J. Suda, Edelstein; William J. Hays, Peoria, all of Ill.

[73] Assignee: Caterpillar Inc., Peoria, Ill.

[21] Appl. No.: 331,001

[22] Filed: Oct. 28, 1994

[51] Int. Cl.⁶ ............................................. F02M 21/02
[52] U.S. Cl. ................................... 123/526; 123/527
[58] Field of Search .............................. 123/525, 526, 123/527, 27 GE

[56] References Cited

U.S. PATENT DOCUMENTS

| | | | |
|---|---|---|---|
| 4,501,253 | 2/1985 | Gerstmann et al. | 123/1 A |
| 4,548,172 | 10/1985 | Bailey | 123/298 |
| 4,704,997 | 11/1987 | Endo et al. | 123/198 |
| 4,721,081 | 1/1988 | Krauja et al. | 123/298 |
| 4,742,801 | 5/1988 | Kelgard | 123/279 GE |
| 4,907,565 | 3/1990 | Bailey et al. | 123/23 |
| 5,067,458 | 11/1991 | Bailey | 123/292 |
| 5,067,467 | 11/1991 | Hill et al. | 123/525 |
| 5,075,536 | 12/1991 | Towe et al. | 219/270 |
| 5,084,606 | 1/1992 | Bailey et al. | 219/270 |
| 5,136,986 | 8/1992 | Jensen | 123/527 |
| 5,271,371 | 12/1993 | Meints et al. | 123/446 |
| 5,315,973 | 5/1994 | Hill et al. | 123/27 GE |
| 5,383,647 | 1/1995 | Jorach et al. | 123/527 |

*Primary Examiner*—Erick R. Solis
*Attorney, Agent, or Firm*—Marshall, O'Toole, Gerstein, Murray & Borun; Joseph W. Keen

[57] ABSTRACT

A liquid propane injection system for a diesel engine includes a liquid propane fuel tank, a pump, a heat exchanger, a reservoir, and an injector. The pump receives liquid propane from the liquid propane fuel tank, and increases the pressure of the received liquid propane to a level suitable for use by the diesel engine. The heat exchanger receives liquid propane from the pump, and vaporizes the liquid propane. The reservoir stores vaporized liquid propane received from the heat exchanger, and has sufficient storage capacity to compensate for any time lag between instantaneous engine fuel demand and the supply of liquid propane by the pump. The injector receives vaporized liquid propane from the reservoir, and injects the vaporized liquid propane into a combustion chamber of the diesel engine.

20 Claims, 5 Drawing Sheets

DIRECT INJECTION PROPANE FUEL SYSTEM FOR DIESEL ENGINE APPLICATIONS

TECHNICAL FIELD

The present invention relates to a propane fuel system for direct injection diesel engine applications.

BACKGROUND OF THE INVENTION

The burning of gasoline by conventional spark ignition engines is considered to be a significant contributor to poor air quality, at least in certain geographical areas. As a result, efforts have been undertaken, and are being undertaken, to develop engines which can operate on alternative fuels which burn more cleanly than gasoline. These alternative fuels include natural gas, propane, methanol, ethanol, hydrogen, reformulated gasoline, and biodiesel (i.e., vegetable oil esters). The engines which are being developed to burn these alternative fuels are primarily spark-ignited, light duty engines for use in automobiles.

Electrically powered vehicles, which would not require the direct burning of gasoline or any of the alternative fuels, are also currently being developed. Therefore, presumably, replacing conventionally powered vehicles with electrically powered vehicles would result in a net reduction of the contribution to poor air quality attributable to vehicles. However, while electric motors can replace gasoline engines (typically Otto cycle) and diesel cycle engines (hereinafter, "diesel engines"), electric motors are not yet cost effective, nor are they reliable in heavy duty applications.

Ideally, if diesel engines can be made to burn alternative fuels, the power advantages, the fuel consumption advantages, and the heat rejection advantages of diesel engines over spark ignited engines can be retained. However, except for the case of biodiesel, significant modifications of diesel engines capable of forming fuel oil (hereinafter "diesel fuel") are required to permit alternative fuels to be burned therein.

For example, while diesel engines can be converted to burn natural gas, natural gas engine systems require either a large gas compressor to compress the natural gas, or a cryogenic tank to store liquid natural gas and a high pressure supply pump to pump the liquid natural gas to the combustion cylinders of the engine. Such systems, therefore, involve higher expenses than are involved in conventional diesel engines. These higher expenses associated with such natural gas engines are not easily offset by the lower cost of the natural gas fuel. That is, while the expenses of converting large diesel engines over to natural gas may be offset within a reasonable amount of time by the lower price of natural gas, the expenses of converting smaller engines, such as engines having less than about ten liters of displacement, over to natural gas are not so easily offset by the lower price of natural gas.

Furthermore, while burning biodiesel in a diesel engine does not require significant engine modifications, the cost of biodiesel fuel currently is approximately three times that of conventional diesel fuel.

Propane, however, offers a reasonable alternative. The cost of propane is higher than the cost of natural gas and, in fact, approaches the cost of diesel fuel. Yet, a diesel engine which is converted to burn propane does not require a large gas compressor, or a cryogenic tank and a high pressure supply pump, as does a diesel engine which is converted to burn natural gas. Therefore, although a diesel engine which is converted to burn propane may cost somewhat more than a conventional diesel engine, the cost is less than the cost of converting a diesel engine to burn other alternative fuels and is reasonable considering its less harmful impact on the environment.

DISCLOSURE OF THE INVENTION

Accordingly, the present invention is directed towards a direct injection propane fuel system for diesel engines. In one aspect of the present invention, a propane injection system for a diesel engine comprises a source of liquid propane, a pump having an inlet and an outlet, a heat exchanger having an inlet and an outlet, a reservoir having an inlet and an outlet, and an injector having an inlet and an outlet. The inlet of the pump is connected to the source of liquid propane, and the pump is arranged to pump liquid propane from the source of liquid propane through the inlet of the pump and to the outlet of the pump so as to increase pressure of the liquid propane to a level suitable for use by the diesel engine. The inlet of the heat exchanger is connected to the outlet of the pump so that the heat exchanger receives liquid propane from the pump. The heat exchanger is arranged to vaporize the liquid propane received from the pump in order to provide propane gas at its outlet. The inlet of the reservoir is connected to the outlet of the heat exchanger so that the reservoir receives propane gas from the heat exchanger. The reservoir stores propane gas received from the heat exchanger. The inlet of the injector is connected to the outlet of the reservoir so that the injector receives propane gas from the reservoir. The injector is arranged to supply propane gas through its outlet to a combustion chamber of the diesel engine.

In another aspect of the present invention, a propane injection system for a diesel engine comprises a source of liquid propane, a pressure increasing means connected to the source of liquid propane for increasing pressure of the liquid propane to a level suitable for use by the diesel engine, a vaporizing means connected to the pressure increasing means for vaporizing the liquid propane having the increased pressure, a storing means connected to the vaporizing means for storing the vaporized liquid propane at the pressure provided by the pressure increasing means, and an injecting means connected to the storing means for injecting the vaporized liquid propane into a combustion cylinder of the diesel engine.

In still another aspect of the present invention, a propane injection system for a diesel engine comprises a liquid propane supply which is arranged to supply liquid propane at a suitable pressure so that the liquid propane may be burned by the diesel engine, a vaporizer which is arranged to vaporize the liquid propane having the suitable pressure, and an injector which is arranged to inject the vaporized liquid propane having the suitable pressure into a combustion chamber of the diesel engine.

BRIEF DESCRIPTION OF THE DRAWINGS

These and other features and advantages will become more apparent from a detailed consideration of the invention when taken in conjunction with the drawing in which.

BEST MODE FOR CARRYING OUT THE INVENTION

Figure 1:
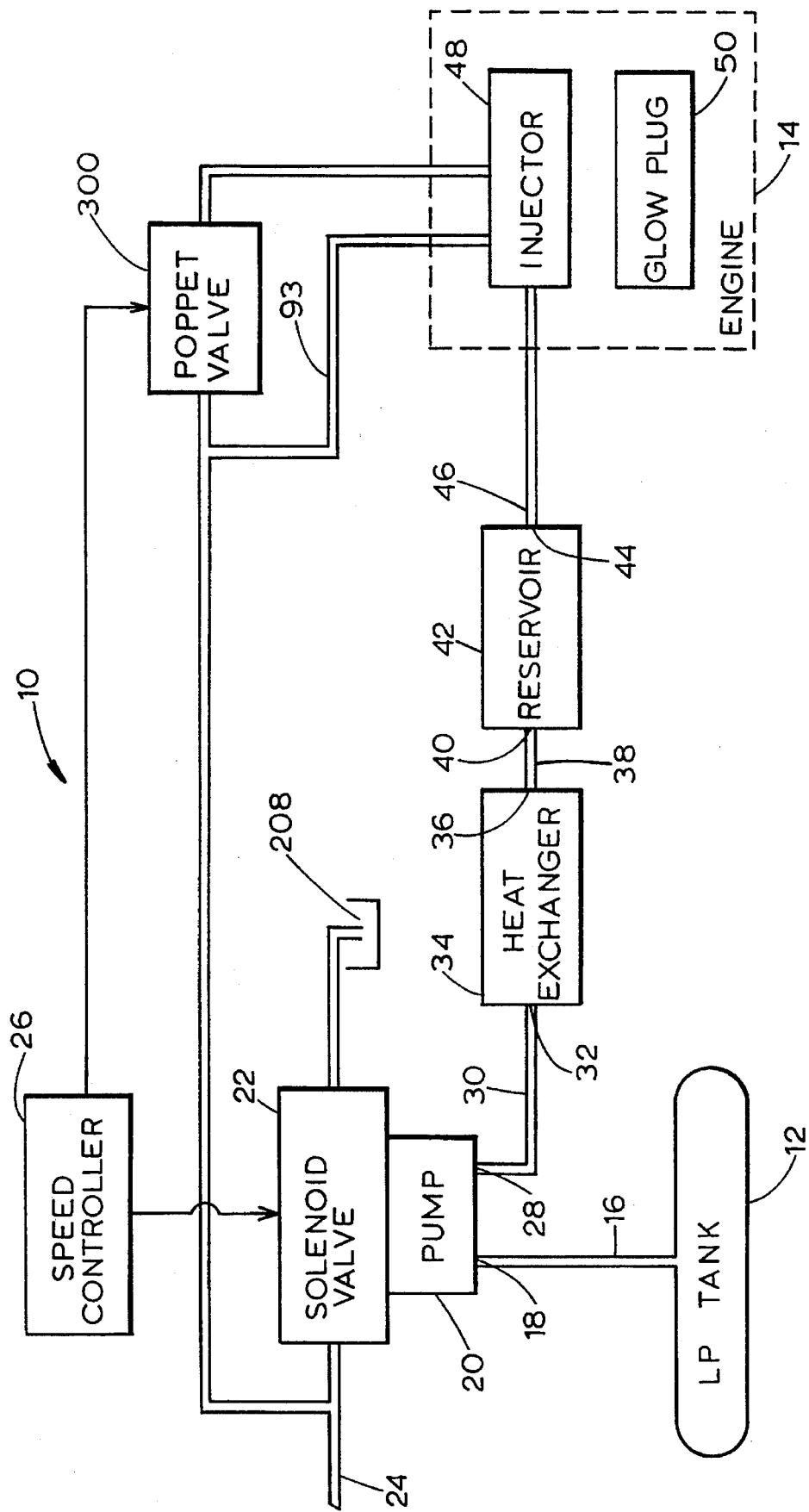
FIG. 1 is a schematic diagram showing the direct injection propane fuel system according to the present invention.

A direct ignition propane fuel system 10 according to the present invention is shown in FIG. 1. The direct ignition propane fuel system 10 includes a liquid propane fuel tank 12 for storing liquid propane to be burned in a diesel engine 14. The liquid propane fuel tank 12 is connected by a fuel line 16 to a pump inlet 18 of a pump 20. The pump 20, which operates under control of a solenoid operated valve 22, increases the pressure of the liquid propane to a level which is suitable for burning in the diesel engine 14. The liquid propane stored in the liquid propane fuel tank 12 enters the pump 20 through the fuel line 16 and the pump inlet 18 at ambient temperature.

The pump 20 is hydraulically driven by hydraulic fluid from a high pressure hydraulic line 24. This hydraulic fluid is delivered to the pump 20 under control of the solenoid operated valve 22 which is controlled by the engine's conventional electronic engine speed controller 26 in order to cycle the pump 20 as required to match the fuel delivery needs of the diesel engine 14.

The pump 20 has a pump outlet 28 which is connected by way of a high pressure fuel line 30 to a heat exchanger inlet 32 of a heat exchanger 34. Thus, the pump 20 delivers high pressure liquid propane through the high pressure fuel line 30 to the heat exchanger 34. The heat exchanger 34 transfers heat into the liquid propane in order to thereby vaporize the liquid propane into propane gas. The heat exchanger 34 may include, for example, a heat exchange coil which receives engine coolant in order to transfer the heat of the engine coolant to the liquid propane. This heat, which is transferred from the heat exchanger 34 to the liquid propane, causes the liquid propane to vaporize into propane gas. Alternatively, the heat exchanger can include an electrical heater which is supplied with electricity from an electrical system powered by the engine. The heat produced by the flow of electricity through the electric heater vaporizes the liquid propane to produce propane gas.

The heat exchanger 34 has a heat exchanger outlet 36 which is connected by way of gas fuel line 38 to a reservoir inlet 40 of a reservoir 42. Thus, in response to the pressure provided by the pump 20, the heat exchanger 34 provides high pressure propane gas to the reservoir 42. The reservoir 42 stores this high pressure propane gas and has sufficient storage capacity to compensate for any time lag between instantaneous engine fuel demand, as dictated by the electronic engine speed controller 26, and the supply of propane gas to the diesel engine 14. The reservoir 42 has a reservoir outlet 44 which is connected by a fuel gas line 46 to a gas injector 48 for injecting the propane gas into a combustion cylinder of the diesel engine 14. The gas injector 48 extends into this combustion cylinder through the cylinder head of the diesel engine 14.

Also extending through the cylinder head of the diesel engine 14 into this combustion cylinder is a corresponding glow plug 50 which acts as an ignition assist for the ignition of propane gas injected into the combustion cylinder of the diesel engine 14. Thus, the glow plug 50 helps to light off the propane gas injected into its corresponding combustion cylinder of the diesel engine 14.

For a multiple cylinder diesel engine, only one liquid propane fuel tank 12, one pump 20, one heat exchanger 34, and one reservoir 42 are typically needed to supply propane gas to all of the cylinders. Each such cylinder would, however, have its own injector 48 and glow plug 50.

Figure 2:
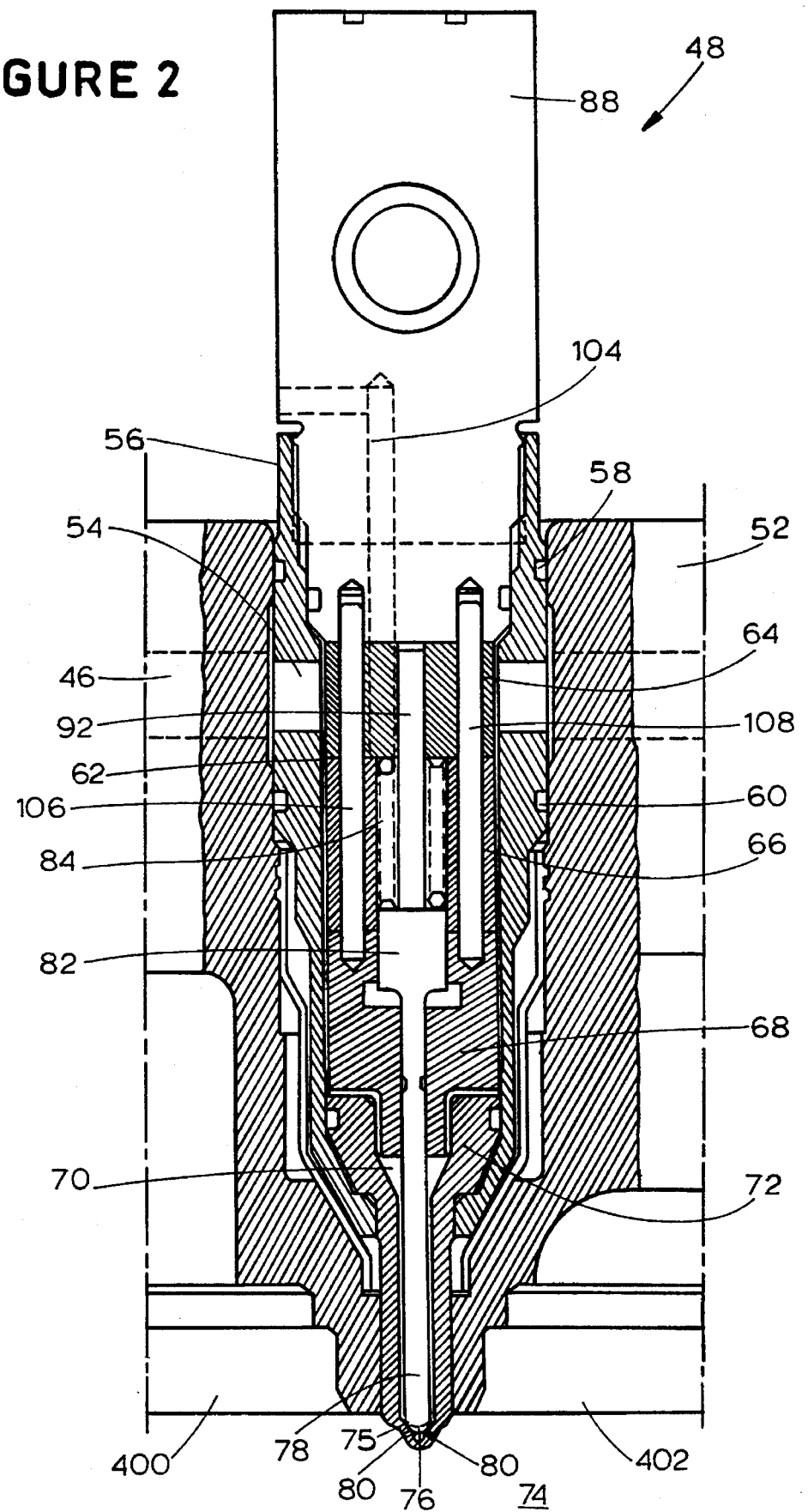
FIG. 2 is a cross-sectional frontal view of the injector shown in FIG. 1.
Figure 3:
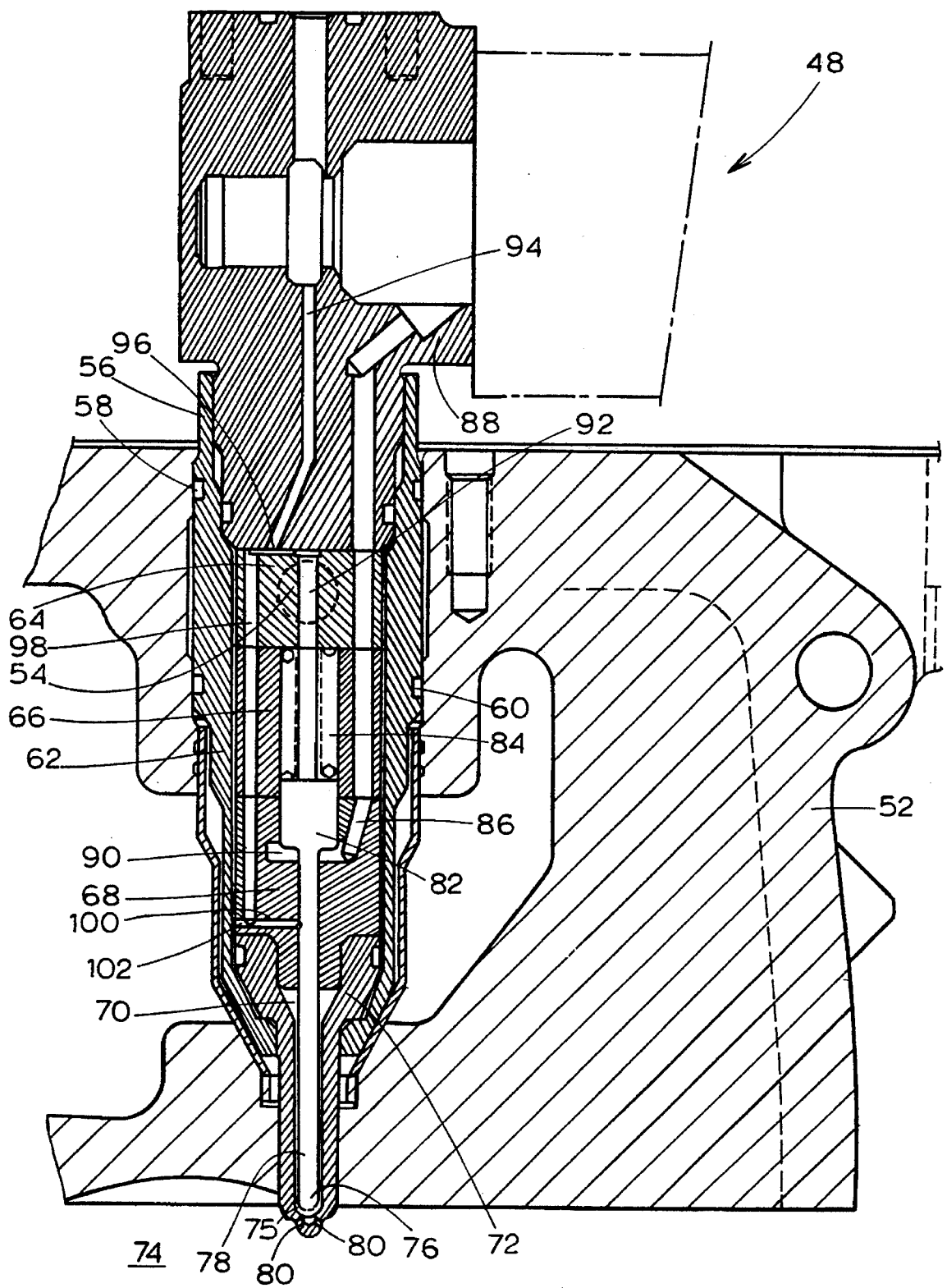
FIG. 3 is a cross-sectional side view of the injector shown in FIG. 1.

Although any conventional injector may be used in the present invention as the gas injector 48, one convenient form for the gas injector 48 is shown in FIGS. 2 and 3. As shown in FIG. 2, the gas injector 48 extends through a cylinder head 52 of the diesel engine 14. The gas injector 48 is supplied with propane gas through the fuel gas line 46. This propane gas enters the gas injector 48 through an opening 54 in an injector cone 56 of the gas injector 48. A pair of O-rings 58 and 60 seal the injector cone 56 from the cylinder head 52 in order to prevent the propane gas from leaking out between the cylinder head 52 and the gas injector 48. Each of the O-rings 58 and 60 is shown as a single O-ring; however, each of the O-rings 58 and 60 may instead be two or more O-rings.

As propane gas enters the gas injector 48 through the opening 54, the propane gas flows through an annulus 62 which extends along an inner surface of the injector cone 56 between the injector cone 56 and three internal injector components 64, 66, and 68. The propane gas flows from the opening 54, through the annulus 62, and into an injector gas chamber 70 formed between an injector nozzle 72 and the internal injector component 68.

Propane gas is injected from the injector gas chamber 70 into a combustion chamber 74 of a combustion cylinder of the diesel engine 14 by controlling a needle valve in the injector nozzle 72 of the gas injector 48. This needle valve includes a valve seat 75, which is formed around an internal surface of the injector nozzle 72, and an injector valve member 76, which is at the end of a needle 78. The position of the injector valve member 76 with respect to the valve seat 75 controls the flow of propane gas from the injector gas chamber 70, through a plurality of injector orifices 80, and into the combustion chamber 74 of a combustion cylinder of the diesel engine 14. The position of the injector valve member 76 with respect to the valve seat 75 is controlled by a lift piston 82 which may be integrally formed with the needle 78. A spring 84, which is located in a spring chamber within the internal injector component 66, has one end which abuts the internal injector component 64 and another end which abuts the lift piston 82. Accordingly, the spring 84 biases the lift piston 82 in a direction to close the injector valve member 76 against the valve seat 75 so as to prevent the flow of propane gas through the injector orifices 80.

As shown in FIG. 3, hydraulic fluid under control of a solenoid operated valve, such as a solenoid operated popper valve, is supplied through a passageway 86, which extends through the internal injector components 64, 66, and 68 and through an injector body 88 of the gas injector 48, to a lift chamber 90 beneath the lift piston 82. The pressure in the lift chamber 90 applies a force to the lift piston 82 in a direction opposite to the force applied to the lift piston 82 by the spring 84. Accordingly, if the pressure within the lift chamber 90 is sufficiently large, the lift piston 82 moves the needle 78 upward to unseat the injector valve member 76 from the valve seat 75 and allow propane gas to flow from the injector gas chamber 70, through the injector orifices 80, and into the combustion chamber 74 of the diesel engine 14.

A plunger pin 92 extends through a precision hole in the internal injector component 64 and through the spring chamber in the internal injector component 66 to abut the lift piston 82. High pressure hydraulic fluid is supplied through a hydraulic line 93 (see FIG. 1), which is connected to the high pressure hydraulic line 24, and through a passageway 94 in the injector body 88 to a channel 96. The channel 96 is formed in the top surface of the internal injector component 64 between the top surface of the internal injector component 64 and the bottom of the injector body 88.

The high pressure hydraulic fluid supplied through the passageway 94 to the channel 96 applies a hydraulic pressure against the top of the plunger pin 92. This hydraulic pressure, which is applied to the top of the plunger pin 92, causes the plunger pin 92 to apply a force against the lift piston 82 which adds to the force applied to the lift piston 82 by the spring 84. Therefore, for the injector valve member 76 to be lifted off of the valve seat 75, the pressure within the lift chamber 90 must overcome both the force applied to the lift piston 82 by the spring 84 and the force applied to the lift piston 82 by the plunger pin 92.

The hydraulic pressure supplied through the passageway 94 to the channel 96 is also connected by way of a passageway 98, which extends through the internal injector components 64, 66, and 68, to a lateral passageway 100, which extends between the passageway 98 and the needle 78. Accordingly, high pressure hydraulic fluid is applied laterally against the needle 78 to hydraulically isolate the propane gas in the injector gas chamber 70 from the hydraulic fluid in the lift chamber 90. A plug 102 is provided in the passageway 100 to isolate the propane gas in the annulus 62 from the hydraulic fluid in the passageway 100.

The hydraulic load applied to the plunger pin 92 through the passageway 94 and the channel 96 operates in parallel with the spring 84 to quickly close the injector valve member 76 at the end of the needle 78 against the valve seat 75 in the injector nozzle 72 when the pressure in the lift chamber 90 is vented by way of the poppet valve which controls the supply of hydraulic fluid to the lift chamber 90 through the passageway 86. When the injector valve member 76 is closed against the valve seat 75, the flow of propane gas to the combustion chamber 74 is cut off.

As shown in FIG. 2, the cavity within the internal injector component 66, which contains the spring 84, is vented by way of a passageway 104 which extends through the injector body 88 and the internal injector component 64. Any hydraulic fluid leaking around the lift piston 82 from the lift chamber 90, and around the plunger pin 92 from the channel 94, to the spring cavity containing the spring 84 may be returned to a hydraulic sump through the passageway 104. A pair of dowels 106 and 108 extend through the injector body 88 and the internal injector components 64, 66, and 68 in order to maintain a constant positional relationship between the internal injector components 64, 66, and 68 with respect to the injector body 88.

Figure 4:
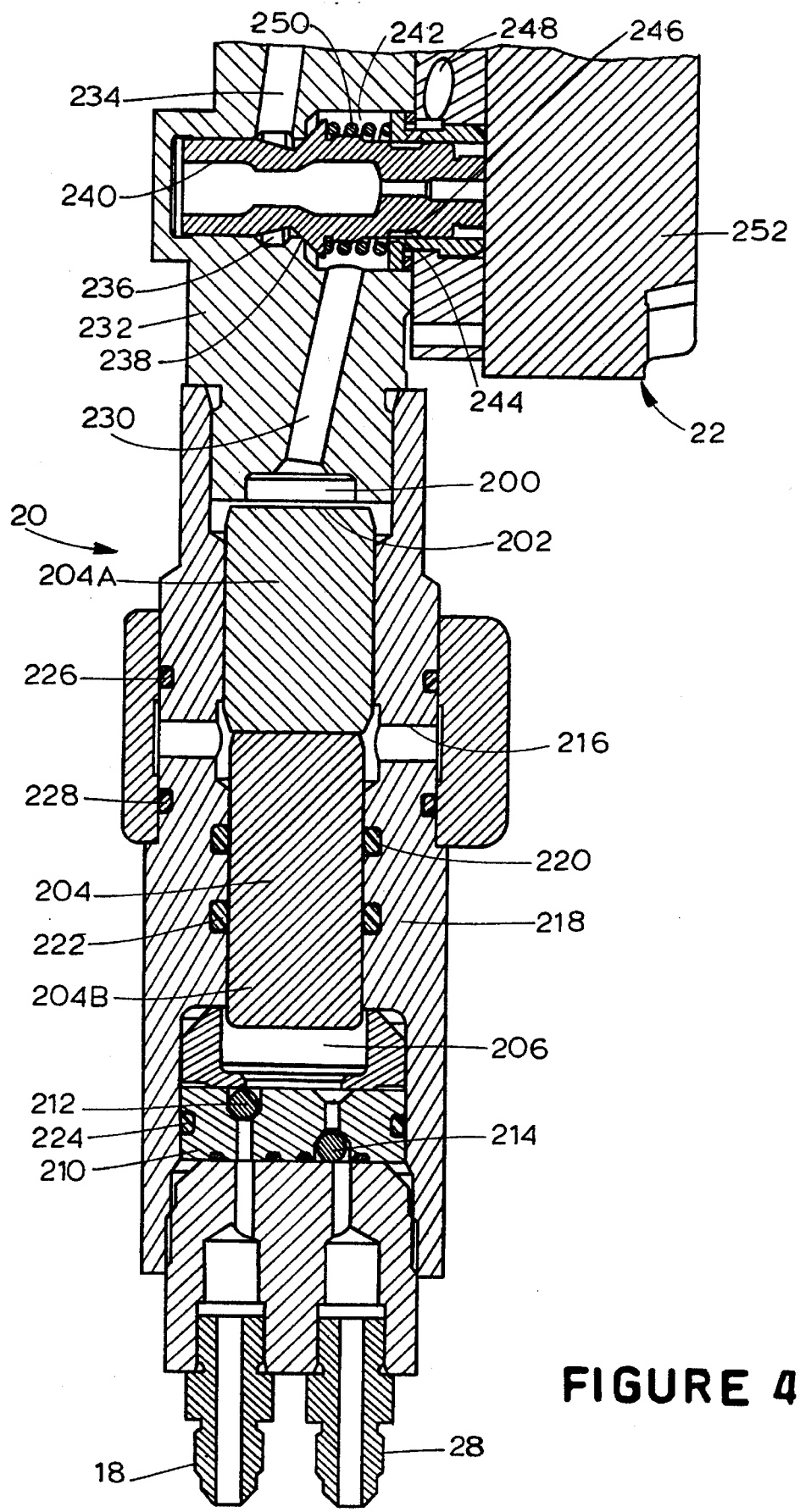
FIG. 4 is a cross-sectional view of the pump shown in FIG. 1.

The pump 20 is shown in more detail in FIG. 4. The pump 20, as described above, may be controlled by the solenoid operated valve 22 which controls the supply of hydraulic actuating fluid to the pump 20. The pump 20 receives this hydraulic actuating fluid in a chamber 200 so that the hydraulic actuating fluid applies a force against a top surface 202 of a two-part piston 204. The two-part piston 204 includes a first piston part 204A and a second piston part 204B.

The first piston part 204A has a larger diameter than the second piston part 204B. To stroke the pump 20, the solenoid operated valve 22 supplies hydraulic actuating fluid to the chamber 200. The hydraulic actuating fluid in the chamber 200 accordingly applies a pressure against the top surface 202 of the first piston part 204A. The force resulting from the application of hydraulic actuating fluid against the top surface 202 of the first piston part 204A drives both the first and second piston parts 204A and 204B. Thus, the second piston part 204B is driven downward into a liquid propane pump chamber 206. At the end of this pump stroke, the solenoid operated valve 22 drains the hydraulic actuating fluid from the chamber 200 of the pump 20 to a hydraulic sump 208 (shown in FIG. 1). Accordingly, the solenoid operated valve 22 removes the supply of hydraulic actuating fluid from the chamber 200, which removes the pressure from the top surface 202 of the first piston part 204A.

As can be seen from FIG. 4, no return spring for the two-part piston 204 is included in the pump 20 since the pressure of the liquid propane within the liquid propane pump chamber 206 is normally sufficient to return the two-part piston 204 to its un-stroked position. For example, the liquid propane may be stored in the liquid propane fuel tank 12 at an elevated pressure in order to maintain the propane in a liquid state. This pressure may be sufficient to return the two-part piston 204 to its initial, un-stroked position after each pump stroke. Also, a boost pump may be included in the liquid propane fuel tank 12 in order to pump liquid propane from the liquid propane fuel tank 12 to the pump 20. The pressure created by the boost pump in the liquid propane fuel tank 12 may likewise be sufficient to return the two-part piston 204 to its initial, un-stroked position after each pump stroke. Alternatively, a return spring may be included, if necessary, in order to return the two-part piston 204 to its initial, un-stroked position after each pump stroke.

Liquid propane from the liquid propane fuel tank 12 enters the pump 20 through the pump inlet 18. A check valve housing 210 in the pump 20 includes a first check valve 212. The first check valve 212 permits liquid propane from the pump inlet 18 to enter the liquid propane pump chamber 206 of the pump 20, but prevents liquid propane in the liquid propane pump chamber 206 of the pump 20 from flowing back through the pump inlet 18 to the liquid propane fuel tank 12. The check valve housing 210 also includes a second check valve 214 between the liquid propane pump chamber 206 and the pump outlet 28 of the pump 20. The second check valve 214 is arranged to permit liquid propane in the liquid propane pump chamber 206 of the pump 20 to flow through the pump outlet 28 to the heat exchanger 34, but prevents liquid propane from the heat exchanger 34 to flow through the pump outlet 28 into the liquid propane pump chamber 206 of the pump 20.

The diameter of the first piston part 204A is larger than the diameter of the second piston part 204B so that the stroke of the two-part piston 204 is sufficiently quick to pressurize the liquid propane in the liquid propane pump chamber 206 to a desirable level.

Any hydraulic fluid which leaks around the first piston part 204A is returned to the hydraulic sump 208 by way of ports 216 through an outer housing 218 of the pump 20. A plurality of O-ring seals 220 and 222 are provided to isolate the liquid propane pump chamber 206 of the pump 20 from any hydraulic actuating fluid which may have leaked around the first piston part 204A. An O-ring seal 224 is provided to isolate the liquid propane pump chamber 206 of the pump 20 from the exterior of the outer housing 218 of the pump 20. A plurality of O-ring seals 226 and 228 are provided to isolate the exterior of the outer housing 218 of the pump 20 from any hydraulic actuating fluid which may have leaked around the first piston part 204A.

The solenoid operated valve 22 is also shown in FIG. 4. The solenoid operated valve 22 controls the supply of hydraulic actuating fluid through a passageway 230 to the chamber 200 in order to stroke the two-part piston 204. The solenoid operated valve 22 includes a valve housing 232 having an inlet passageway 234 which is connected to the high pressure line 24, which extends through the valve housing 232, and which communicates with a chamber 236.

The valve housing 232 of the solenoid operated valve 22 includes a first valve seat 238 which cooperates with a valve member 240 to control the flow of hydraulic actuating fluid from the inlet passageway 234, to a chamber 242, and out of the chamber 242 through the passageway 230 to the chamber 200. The valve housing 232 of the solenoid operated valve 22 also includes a second valve seat 244 which cooperates with the valve member 240 to control the return of hydraulic actuating fluid from the chamber 200, through the passageway 230, through the second valve seat 244, through a passageway 246, through a passageway 248, and back to the hydraulic sump 208. A return spring 250 in the chamber 242 biases the valve member 240 against the first valve seat 238 and away from the second valve seat 244.

A solenoid 252 is electrically connected to the electronic engine speed controller 26 and operates in response thereto to control the position of the valve member 240 with respect to the first and second valve seats 238 and 244. Accordingly, the electronic engine speed controller 26 controls the solenoid operated valve 22, which in turn controls the pump 22, in order to meet the demand of the diesel engine 14 for propane gas. Thus, when more propane gas is to be supplied to the combustion chamber 74 of the diesel engine 14, the solenoid 252 is controlled by the electronic engine speed controller 26 to drive the pump 22 at a faster rate, and when less propane gas is to be supplied to the combustion chamber 74 of the diesel engine 14, the solenoid 252 is controlled by the electronic engine speed controller 26 to drive the pump 22 at a slower rate. Alternatively, the solenoid operated valve 22 may be pulse width modulated in order to control the pump 20 so as to meet the fuel requirements of the diesel engine 14. Thus, instead of controlling the rate at which the pump 22 is stroked, the relative down-stroke and up-stroke times may be controlled. Accordingly, the solenoid operated valve 22 is electronically controlled by the electronic engine speed controller 26 to match the fuelling and maximum propane gas pressure requirements of the diesel engine 14.

Figure 5:
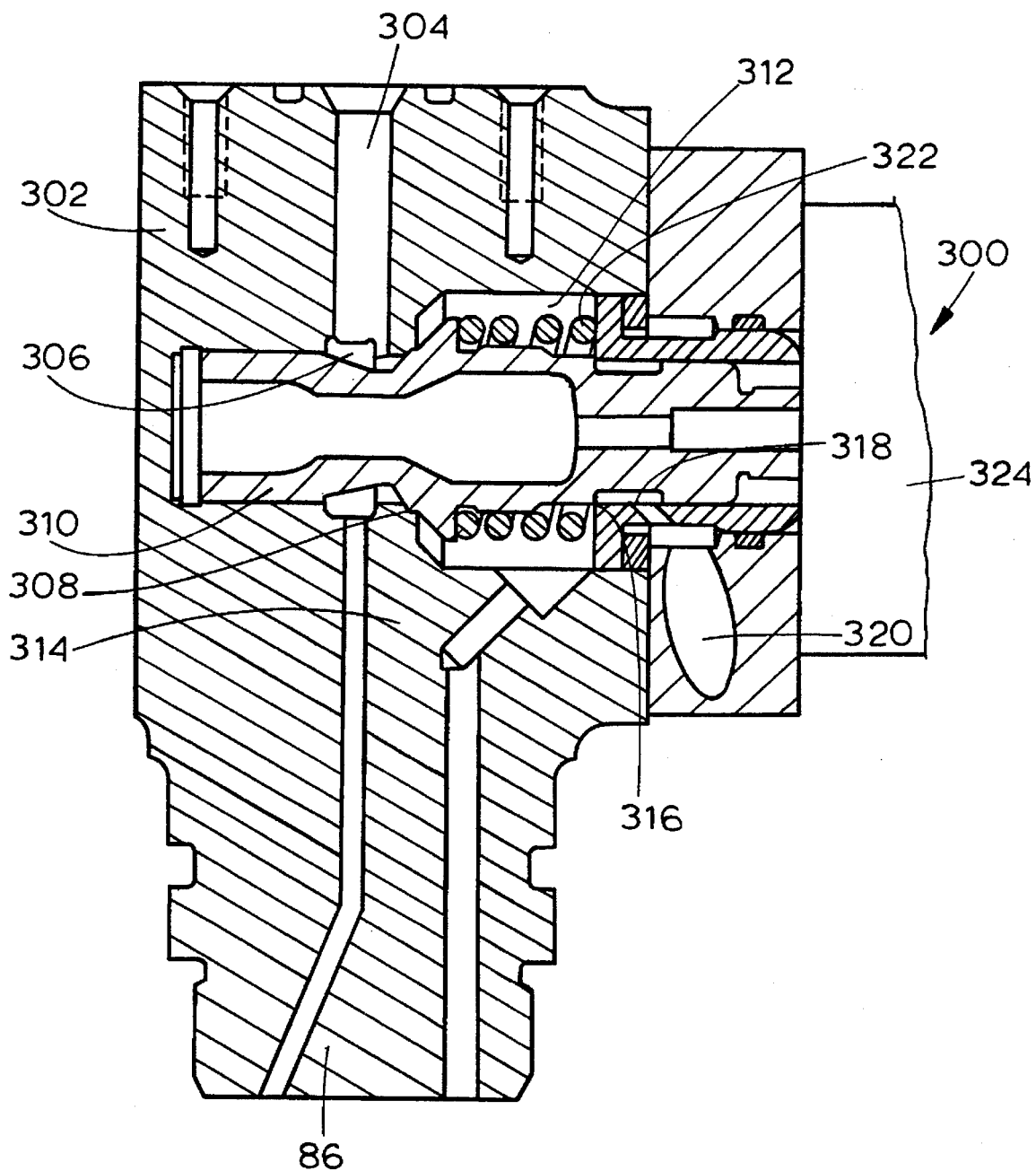
FIG. 5 shows a popper valve arrangement which may be used to control the injector shown in FIGS. 1, 2, and 3.

An example of a poppet valve, i.e. a poppet valve 300, which controls the injector 48, is shown in FIG. 5 and is similar to the solenoid valve 22 shown in FIG. 4. The poppet valve 300 controls the supply of hydraulic actuating fluid through the passageway 86 of the gas injector 48 in order to operate on the lift piston 82 to raise the injector valve member 76 from the injector valve seat 75 in the injector nozzle 72. The poppet valve 300 includes a poppet valve housing 302 having an inlet passageway 304 which is connected to the high pressure line 24, which extends through the poppet valve housing 302, and which communicates with a chamber 306.

The poppet valve housing 302 of the poppet valve 300 includes a first poppet valve seat 308 which cooperates with a poppet valve member 310 to control the flow of hydraulic actuating fluid from the inlet passageway 304 to a chamber 312 and out of the chamber 312 through an outlet passageway 314 to the passageway 86. The popper valve housing 302 of the poppet valve 300 also includes a second poppet valve seat 316 which cooperates with the poppet valve member 310 to control the return of hydraulic actuating fluid from the passageway 86, through the outlet passageway 314, through the second popper valve seat 316, through a passageway 318, through a passageway 320, and back to the hydraulic sump 208. A return spring 322 in the chamber 312 biases the poppet valve member 310 against the first poppet valve seat 308 and away from the second poppet valve seat 316.

A solenoid 324 is electrically connected to the electronic engine speed controller 26 and operates in response thereto to control the position of the poppet valve member 310 with respect to the first and second popper valve seats 308 and 316. Accordingly, the electronic engine speed controller 26 controls the popper valve 300, which in turn controls the gas injector 48, in order to regulate the injection of propane gas into the combustion chamber 74 of the diesel engine 14. Thus, when propane gas is to be supplied to the combustion chamber 74 of the diesel engine 14, the solenoid 324 is energized by the electronic engine speed controller 26 to pull the popper valve member 310 away from the first popper valve seat 308 and to move the popper valve member 310 against the second poppet valve seat 316. Accordingly, the popper valve 300 controls the supply of hydraulic fluid to the lift chamber 90 under the lift piston 82 in order to control the injection of propane gas into the combustion chamber 74 of the diesel engine 14.

At the end of injection, the solenoid 324 is de-energized by the electronic engine speed controller 26 allowing the return spring 322 to move the popper valve member 310 against the first poppet valve seat 308 and to move the poppet valve member 310 away from the second poppet valve seat 316. Accordingly, the poppet valve 300 controls the return of hydraulic actuating fluid from the lift chamber 90 under the lift piston 82 to the hydraulic sump 208 in order to terminate the injection of propane gas into the combustion chamber 74.

As shown in FIG. 2, an exhaust valve 400 is provided to exhaust the combustion gases from the combustion chamber 74, and an intake valve 402 is provided to provide air to the combustion chamber 74. The glow plug 50 assists in the ignition of the propane gas and air mixture in the combustion chamber 74.

Industrial Applicability

Liquid propane is stored in the liquid propane fuel tank 12. The pump 20, which operates under control of the solenoid operated valve 22, pumps liquid propane from the liquid propane fuel tank 12 to the heat exchanger 34. The heat exchanger 34 transfers heat into the liquid propane in order to vaporize the liquid propane into propane gas. Under pressure of the pump 20, propane gas is transferred from the heat exchanger 34 to the reservoir 42.

The reservoir 42 stores the propane gas and has sufficient storage capacity in order to compensate for any time lag between instantaneous engine fuel demand as dictated by the electronic engine speed controller 26 and the supply of propane gas as provided by the pump 20 to the diesel engine 14. Again under pressure of the pump 20, propane gas is supplied from the reservoir 42 to the gas injector 48. The gas injector 48 injects the propane gas into the combustion cylinder of the diesel engine 14.

The propane gas, which is injected into the combustion chamber 74, is mixed with air, which is supplied through the intake valve 402. The fuel and air mixture is ignited with the assistance of the glow plug 50. Exhaust gases are exhausted through the exhaust valve 400.

When the load or speed of the diesel engine 14 is to be increased, the electronic engine speed controller 26 controls the poppet valve 300 to increase the supply of propane gas to the combustion chamber 74. Since the supply of propane gas to the combustion chamber 74 is being increased, a greater amount of propane gas must be supplied to the reservoir 42 to meet the increased demand for propane gas. Therefore, the electronic engine speed controller 26 operates through the solenoid operated valve 22 to increase the frequency, or duration of on-time, of the pump strokes of the pump 20. The pump 20, therefore, pumps more liquid propane from the liquid propane fuel tank 12 to the heat exchanger 34 where the liquid propane is vaporized into propane gas. Under pressure of the pump 20, more propane gas is, therefore, transferred from the heat exchanger 34 to the reservoir 42.

On the other hand, when the speed of the diesel engine 14 is to be decreased, the electronic engine speed controller 26 controls the poppet valve 300 to decrease the supply of propane gas to the combustion chamber 74. Since the supply of propane gas to the combustion chamber 74 is being decreased, a lesser amount of propane gas need be supplied to the reservoir 42 to meet the decreased demand for propane gas. Therefore, the electronic engine speed controller 26 operates through the solenoid operated valve 22 to decrease the frequency, or duration of on-time, of the pump strokes of the pump 20. The pump 20, therefore, pumps less liquid propane from the liquid propane fuel tank 12 to the heat exchanger 34 where the liquid propane is vaporized into propane gas. Under pressure of the pump 20, less propane gas is therefore transferred from the heat exchanger 34 to the reservoir 42.

Certain modifications have been discussed above and other modifications to the present invention will occur to those skilled in the art. All such modifications are intended to be within the scope of the present invention.

We claim:

1. A propane injection system for a diesel engine comprising:

a source of liquid propane;

a pump having an inlet and an outlet, wherein the inlet of the pump is connected to the source of liquid propane, wherein the pump is arranged to pump liquid propane from the source of liquid propane through the inlet of the pump to the outlet of the pump, and wherein the pump is arranged to increase the pressure of the liquid propane to the level at which fuel is injected into a combustion chamber of the diesel engine;

a heat exchanger having an inlet and an outlet, wherein the inlet of the heat exchanger is connected to the outlet of the pump so that the heat exchanger receives liquid propane from the pump, and wherein the heat exchanger is arranged to vaporize the liquid propane received from the pump in order to provide propane gas at its outlet;

a reservoir having an inlet and an outlet, wherein the inlet of the reservoir is connected to the outlet of the heat exchanger so that the reservoir receives propane gas from the heat exchanger, and wherein the reservoir stores propane gas received from the heat exchanger; and, an injector having an inlet and an outlet, wherein the inlet of the injector is connected to the outlet of the reservoir so that the injector receives propane gas from the reservoir, and wherein the injector is arranged to supply propane gas through its outlet to a combustion chamber of the diesel engine.

2. The propane injection system of claim 1 wherein the source of liquid propane comprises a fuel tank, and wherein the fuel tank stores a supply of liquid propane to be burned by the diesel engine.

3. The propane injection system of claim 2 wherein the pump includes:

a housing having a chamber;

a check valve in the inlet of the pump for permitting liquid propane from the source of liquid propane to enter the chamber and for preventing liquid propane from the chamber to flow to the source of liquid propane;

a check valve in the outlet of the pump for permitting liquid propane from the chamber to flow to the heat exchanger and for preventing liquid propane from the heat exchanger to enter the chamber; and, a piston for pressurizing liquid propane in the chamber.

4. The propane injection system of claim 3 wherein the reservoir has sufficient capacity to compensate for time lags between instantaneous engine fuel demand and available pressurized liquid propane.

5. The propane injection system of claim 1 wherein the injector includes a lift piston and a nozzle, wherein the lift piston is controlled by variable pressure hydraulic fluid, and wherein the lift piston operates in conjunction with the nozzle to control injection of propane gas into the combustion cylinder.

6. The propane injection system of claim 5 wherein the injector includes a channel for directing high pressure hydraulic fluid to the lift piston so as to seal the vaporized liquid propane controlled by the lift piston from the variable pressure hydraulic fluid.

7. The propane injection system of claim 6 wherein the heat exchanger includes a heater, and wherein the heater is connected to a coolant system of the diesel engine so as to provide vaporizing heat to the liquid propane.

8. The propane injection system of claim 6 wherein the heat exchanger includes an electric heater, and wherein the electric heater provides vaporizing heat to the liquid propane.

9. The propane injection system of claim 1 wherein the reservoir has sufficient capacity to compensate for time lags between instantaneous engine fuel demand and available pressurized liquid propane.

10. A propane injection system for a diesel engine comprising:

a source of liquid propane;

pressure increasing means connected to the source of liquid propane for increasing the pressure of the liquid propane to the level at which fuel is injected into a combustion chamber of the diesel engine;

vaporizing means connected to the pressure increasing means for vaporizing the liquid propane having increased pressure;

storing means connected to the vaporizing means for storing the vaporized liquid propane at the pressure provided by the pressure increasing means; and, injecting means connected to the storing means for injecting the vaporized liquid propane into a combustion cylinder of the diesel engine.

11. The propane injection system of claim 10 further comprising ignition assisting means for assisting ignition of the injected vaporized liquid propane.

12. The propane injection system of claim 10 wherein the source of liquid propane comprises a fuel tank, wherein the fuel tank stores a supply of liquid propane to be burned by the diesel engine.

13. The propane injection system of claim 10 wherein the pressure increasing means includes:

a housing having a chamber;

a first check valve arranged to permit liquid propane from the source of liquid propane to enter the chamber and to prevent liquid propane from the chamber to flow to the source of liquid propane;

a second check valve arranged to permit liquid propane from the chamber to flow to the vaporizing means and to prevent liquid propane from the vaporizing means to enter the chamber; and, a hydraulically actuated piston for pressurizing liquid propane in the chamber.

14. The propane injection system of claim 13 wherein the storing means provides sufficient capacity to compensate for time lags between instantaneous engine fuel demand and available pressurized liquid propane.

15. The propane injection system of claim 10 wherein the injecting means includes a valve member and a valve seat, wherein the valve member is controlled with respect to the valve seat so as to control supply of vaporized liquid propane to the combustion chamber.

16. The propane injection system of claim 15 wherein the injecting means includes sealing means for sealing vaporized liquid propane from variable pressure hydraulic fluid.

17. The propane injection system of claim 16 wherein the vaporizing means includes a heater, and wherein the heater is connected to a coolant system of the diesel engine so as to provide vaporizing heat to the liquid propane.

18. The propane injection system of claim 16 wherein the vaporizing means includes an electric heater, and wherein the electric heater provides vaporizing heat to the liquid propane.

19. The propane injection system of claim 14 further comprising ignition assisting means for assisting in ignition of the injected vaporized liquid propane.

20. The propane injection system of claim 10 wherein the storing means provides sufficient capacity to compensate for time lags between instantaneous engine fuel demand and available pressurized liquid propane.

\* \* \* \* \*